(12) United States Patent
Kanakubo

(10) Patent No.: US 7,072,675 B1
(45) Date of Patent: Jul. 4, 2006

(54) WIRELESS DOCKING STATION SYSTEM AND METHOD FOR A MULTIPLE HANDSET CORDLESS TELEPHONE SYSTEM

(75) Inventor: Hideyuki Kanakubo, Weston, FL (US)

(73) Assignee: Waxess, Inc., Irvine, CA (US)

( * ) Notice: Subject to any disclaimer, the term of this patent is extended or adjusted under 35 U.S.C. 154(b) by 532 days.

(21) Appl. No.: 10/156,439

(22) Filed: May 28, 2002

(51) Int. Cl.
*H04Q 7/20* (2006.01)
(52) U.S. Cl. ............. 455/462; 455/416; 455/552; 455/557; 455/407; 455/425; 455/456.6; 455/463; 455/11.1; 455/127.4; 455/417; 455/420; 455/426.1
(58) Field of Classification Search ............. 455/462, 455/416, 552, 557, 407, 425, 456.6, 463, 455/11.1, 127.4, 417, 420, 426.1
See application file for complete search history.

(56) References Cited

U.S. PATENT DOCUMENTS

| | | | |
|---|---|---|---|
| 2001/0031645 A1* | 10/2001 | Jarrett | 455/552 |
| 2002/0072390 A1* | 6/2002 | Uchiyama | 455/557 |
| 2003/0157929 A1* | 8/2003 | Janssen et al. | 455/416 |

* cited by examiner

*Primary Examiner*—Joseph Feild
*Assistant Examiner*—David Q Nguyen
(74) *Attorney, Agent, or Firm*—Dan Brown Law Office; Daniel R. Brown

(57) ABSTRACT

An apparatus and method of integrating a wireless telephone and a multiple handset cordless telephone system is taught. A docking station is used which receives a wireless telephone and electrically interfaces with in, including power, audio and data interfaces. A controller manages the interface to a transceiver, and speakerphone. The transceiver operates in compliance with a multiple handset cordless telephone system to enable communications therebetween.

19 Claims, 6 Drawing Sheets

WIRELESS DOCKING STATION SYSTEM AND METHOD FOR A MULTIPLE HANDSET CORDLESS TELEPHONE SYSTEM

BACKGROUND OF THE INVENTION

1. Field of the Invention

The present invention relates to telephones. More specifically, the present invention relates to multiple handset cordless systems and wireless telephones.

2. Description of the Related Art

The field of telephony has changed dramatically since the break-up of AT&T in the early 1980's. Competition has driven innovation and the range of products available to consumers has increased accordingly. One area of innovation has been the development of cordless telephones. Cordless telephones are similar to conventional corded telephones in that they are connected by wire to a local central office. However, they differ in that there is no cord between the base unit of the cordless telephone and the handset; thus, they are called 'cordless' telephones. Cordless telephones add the convenience of mobility within the range of coverage of the radio transceivers employed in the base and handset units that comprise the cordless telephone.

The deployment of cellular service established the beginning of a wireless telephony era. The first widely adopted and implemented standard in the United States was AMPS cellular. Later, other standards were implemented, including TDMA (IS-136), CDMA (IS-95), GSM, PCS (various standards), and others. All of these wireless telephones share the characteristic in that there is no local metallic loop between the telephone and a telephone company central office employed to render service. Rather, a wireless telephone network is deployed by a service provider, and wide area coverage (at least respecting the coverage range of a cordless telephone) is delivered via radio signals. Wireless telephones do not typically comprise a base unit; rather, the entire telephone circuitry is inside a single enclosure, including the battery.

Wireless telephones do suffer from certain disadvantages. They are physically small, and hence the user interface is rather compact and reduces the convenience of operation. The transmitter power and received signal strengths are very low, due to the battery power limitations and network infrastructure considerations. This means that radio signal strength is often time so limited that interference and noise become common annoyances during calls. The mobility of the receiver exacerbates this because of the vagaries of radio propagation, including multi-path interference, Rayleigh fading, and physical blocking of radio signal paths. In addition, wireless telephones have limited battery life, especially during extended conversation times.

Cordless telephones offer improved interfaces and performance over wireless telephones in most circumstances. They are usually larger and have more complete and convenient user interfaces. The base unit can house voice messaging systems and speakerphones. They operate in a small geographic area so that signal levels at the receivers of both the base and handset are higher, offering better receiver quieting, higher signal to noise ratios, and less interference generally. They also offer longer battery life standby and talk times, owing to their larger batteries and their more extended times at rest on a charging cradle. Recently, manufacturers of cordless telephones have developed multiple handset cordless telephone systems. A multiple handset system typically employs a base unit and multiple handsets. Handsets are able to communicate between each other as an intercom, in addition to communicating with the base unit for interconnectivity with the public switch telephone network. Multiple handset cordless systems may operate in various frequency bands, 900 MHz, 2.4 GHz and others. The communications protocol used in multiple handset cordless systems may be proprietary or follow a promulgated standard, such as the Bluetooth standard, known to those skilled in the art.

The trend for many users of wireless telephones is toward using their wireless telephone as the principal communications device, even over the traditional wired and corded telephones. Users merely keep their wireless telephone with them at all times, whether during travel, at home, or at work. Thus, they are readily reachable by calling to the wireless telephone number. However, this implies the aforementioned limitations of wireless telephones are always present for such users. It is known in the art to utilize a base unit with a wireless telephone that offers battery charging, hands free operation, and even interfaces to RJ-11 devices, such as wired telephones. However, such devices are cumbersome to use, limit mobility, and may require installation procedures beyond the skill level of average users. The tension between wireless telephones and cordless telephones was mitigated with an invention that integrated a cordless telephone base unit with a wireless telephone docking cradles, and the interconnection of communications signals therebetween. See U.S. patent application Ser. No. 09/737,289 filed on Dec. 13, 2000, to Uchiyama and entitled Cordless and Wireless Telephone Docking Systems. With the deployment of multiple handset cordless telephones, which offer even greater conveniences, the tension between the mobility of wireless telephones and convenience of wireless telephones has increased. Thus, there is a need in the art for an integration apparatus and method to improve upon the utilization of a wireless telephone in a local geographic area while maintaining mobility through the use of cordless telephony technology having multiple handset capabilities and features.

SUMMARY OF THE INVENTION

The need in the art is addressed by the apparatus and methods of the present invention. A docking station for interconnecting telephone calls between a wireless telephone and a multiple handset cordless telephone system method and apparatus are taught. The docking station includes an electrical interface that has an audio signal coupling and a data signal coupling, which engage the wireless telephone. A transceiver operates to communicate via radio signals with the multiple handset cordless telephone system. The transceiver is selectively coupled to the audio signal coupling in the interface. A controller is coupled to control the transceiver and coupled to the data signal coupling in the interface. The controller operates to communicate data signals with the wireless telephone when the wireless telephone is coupled to the electrical interface. Also, the controller operates to process telephone calls between the wireless telephone and the multiple handset cordless telephone system through control of the transceiver, thereby enabling audio communications by selectively coupling the audio signal coupling and the transceiver.

In a specific embodiment, the docking station further includes a power supply coupled to the electrical interface for providing electrical power to the wireless telephone when engaged therewith. In another embodiment, the controller controls the transceiver to operate as a terminal unit in the multiple handset cordless telephone system. The controller may selectively couple the audio signal coupling to the transceiver upon receipt of data indicative of an incoming telephone call from the wireless telephone. The controller may also selectively couple the audio signal coupling to the transceiver upon receipt of data indicative of a call request from the multiple handset cordless telephone system. The call request data may include a called party telephone number, then the controller couples the telephone number to the data signal coupling for use by the wireless telephone.

In a refinement of the present invention, a telephone keypad is added to the docking station and is coupled to the controller. Also, the controller operates to receive telephone number digits from the keypad and couple the telephone number digits to the data signal coupling for use by the wireless telephone. In another refinement, the docking station further includes a speakerphone selectively coupled to the audio signal coupling and the transceiver. The controller may operate to selective couple the speakerphone to the transceiver when the wireless telephone is disengaged from the electrical interface. In a specific embodiment, the docking station further includes an actuator coupled to the controller. Actuation of the actuator causes the controller to selectively couple the speakerphone to the transceiver, thereby enabling speakerphone functionality for the multiple handset wireless telephone systems. Various cordless telephone protocols are applicable, however, in a particular embodiment, the controller controls the transceiver to communicate in accordance with the Bluetooth protocol specification.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches an illustrative embodiment in which a wireless telephone docking station mechanism is implemented as one of the multiple handsets of a cordless telephone system. Multiple handset cordless telephone systems are known in the art. They operate according to a variety of radio air protocols, including the industry standard Bluetooth protocol as well as various manufacturer proprietary protocols. The teachings of the present invention are applicable to all multiple handset cordless telephone systems and protocols. Accordingly, the present invention provides that any multiple handset cordless telephone system may dedicate one of the handset addresses to the role of being an adapter to interface a wireless telephone resource into the cordless system. This is made possible by docking any type of wireless telephone to the inventive docking station, which then couples the audio and data signaling of the wireless telephone onto the cordless system through a compliant radio interface operating in accordance with the cordless systems air protocol. The docking station of the present invention has a cradle for receiving a wireless telephone. The data and audio signals of the wireless telephone interface to a controller and transceiver in the docking station. The transceiver is controlled to operate in accordance with the air protocol of the cordless system. The transceiver is addressed as one of the cordless units of the cordless system and can communicate directly with the base station of the cordless system or directly with the various other handsets in the cordless system. With this arrangement, users are able to access the wireless telephone resource from any of the various cordless handsets in the cordless system. Access may be for placing calls outgoing from the cordless system into the wireless network, or for receiving calls incoming from the wireless network to the cordless system.

Figure 1:
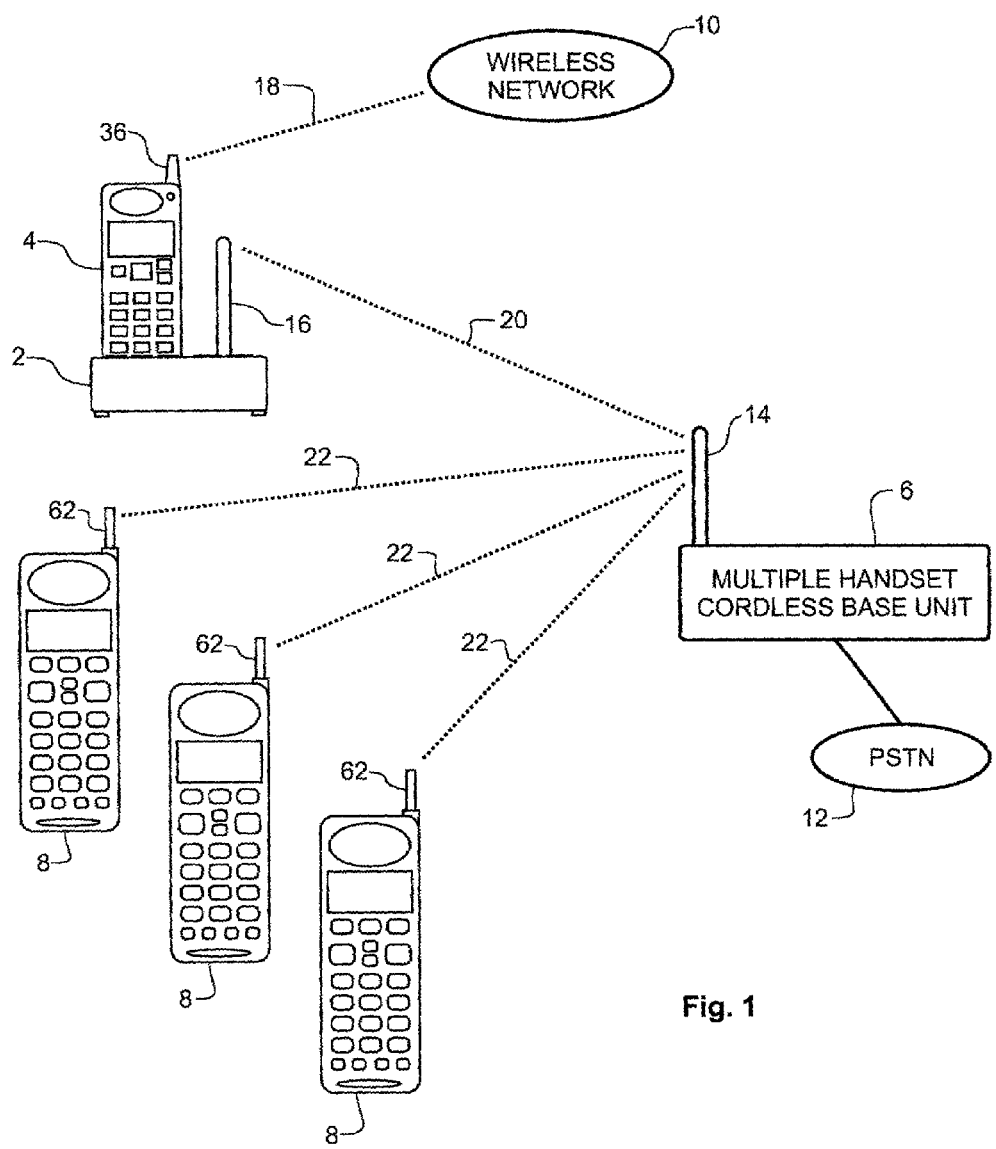
FIG. 1 is a system diagram in an illustrative embodiment of the present invention.

Reference is directed to FIG. 1, which is drawing of an illustrative embodiment cordless and wireless telephone docking station 2 integrated into a cordless telephone systems. The docking station 2 accepts a wireless telephone 4. The wireless telephone 4 rests in the cradle of the docking station 2. The wireless telephone 4 may be of any of the presently available wireless telephone technologies, including but not limited to, AMPS cellular, TDMA wireless, CDMA wireless, PCS, GSM, or other US or international standards, or private systems, or, may be adapted for yet to be released or developed wireless telephone systems and standards, throughout the world.

The wireless telephone 4 employs a conventional wireless antenna 36 to communicate into a wireless telephone network 10 via radio signals 18 that operate in accordance with the particular wireless network 10 protocol specification. Thus, the wireless telephone network 10 provides a telephone resource to the wireless telephone 4. The docking station 2 has an antenna 16 that is used to communicate with the multiple handset cordless telephone base station 6 via radio signals 20 to the base unit 6 antenna 14. The base unit 6 is coupled to the public switched telephone network 12 ('PSTN'), which provides another telephone resource to the multiple handset cordless telephone system. Plural other cordless telephones 8 operate in the vicinity of the cordless base 6 and communicate via radio signals 22 utilizing the cordless system air protocol. The radio signals 22 couple to antennas 62 in the cordless terminal units 8 to and from antenna 14 of the cordless base unit 6. Depending on the particular multiple handset cordless telephone system, the plural terminal units 8 may communicate by direct radio link from one unit to another or such communications may occur by relaying radio signals through the base unit 6.

With the foregoing arrangement in place, the cordless telephones 8 are enabled to operate in the vicinity of the base unit 6 and docking station 2 without the users being tethered by a cord coupled to the handset. The users are able to access telephone resources in the PSTN through either of the wireless network 10 or the base unit 6, coupled to the PSTN 12. There is no need to install any additional wiring when the docking station 2 is implemented into the cordless system. This feature gives the invention a measure of portability of installation and operation. Within the docking station 2, a cordless telephone transceiver unit (not shown) is coupled to the wireless telephone 4. During a wireless based call, and for certain other telephone operations, the wireless telephone 4 and the cordless telephone system are interconnected. Since the wireless telephone is in a fixed position, and that position can be selected where good radio performance is realized, the quality of the wireless communications is improved. Multi-path distortion and Rayleigh fading are improved significantly.

Figure 2:
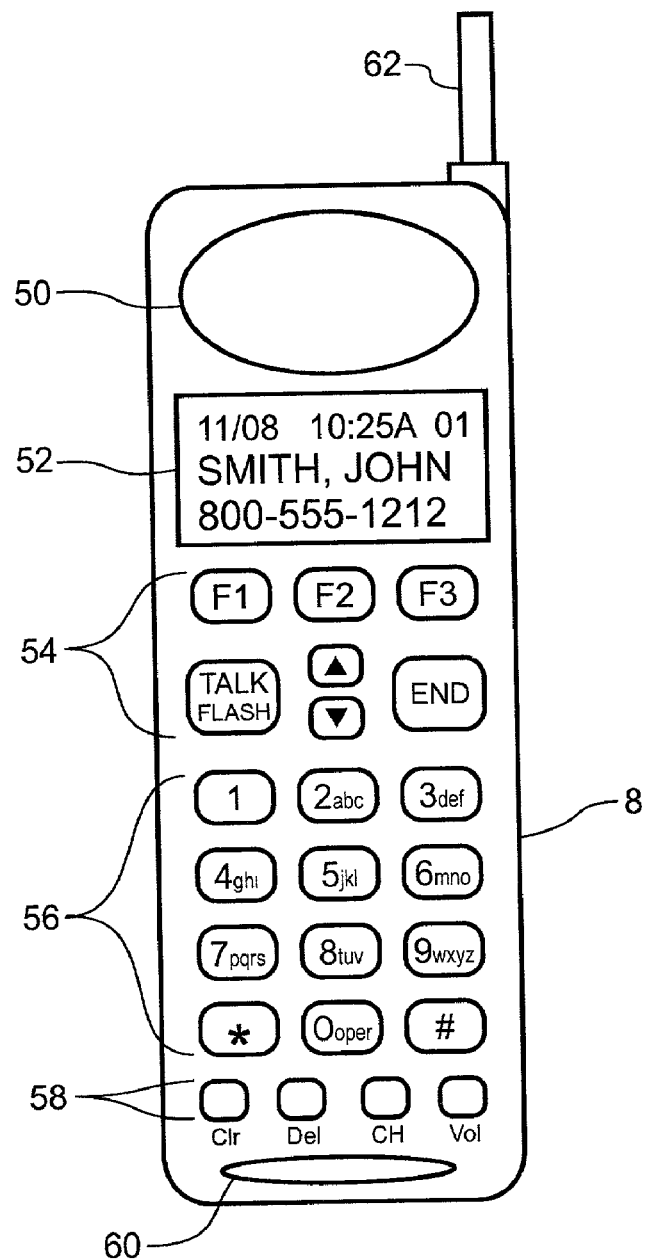
FIG. 2 is a drawing of the user interface of a prior art cordless telephone

FIG. 2 illustrate a typical prior art cordless telephone 8 employed with current multiple handset cordless telephone systems. In FIG. 2, the user interface on the front of the cordless telephone 8 is illustrated. An earphone speaker 50 and a display 52 are present along with a grouping of function keys 54. A conventional telephone keypad 56 is typically used as well as special function keys 58 and a microphone 60. Also, an antenna 62 which is coupled to an internal transceiver (not shown) that enables the cordless telephone 8 to communicate with the base unit 6 transceiver. A user of the cordless telephone 8 can access the PSTN to place outgoing telephone calls. This access is provided through the base unit in the prior art. Through application of the present invention, such access is also provided through the illustrative embodiment docking station, through the wireless telephone network. In a multiple handset cordless telephone system, individual cordless terminal units 8 are addressed within the protocol and are given user definable extensions so that users are able to utilize the system as an intercom, and to transfer calls between units. The extensions allow the users to access the docking station in the illustrative embodiment. For example, the docking station may be assigned extension number one. Users of the terminal units 8 can access the docking station in the same way they would access another terminal unit, through access to extension one, for example.

Figure 3:
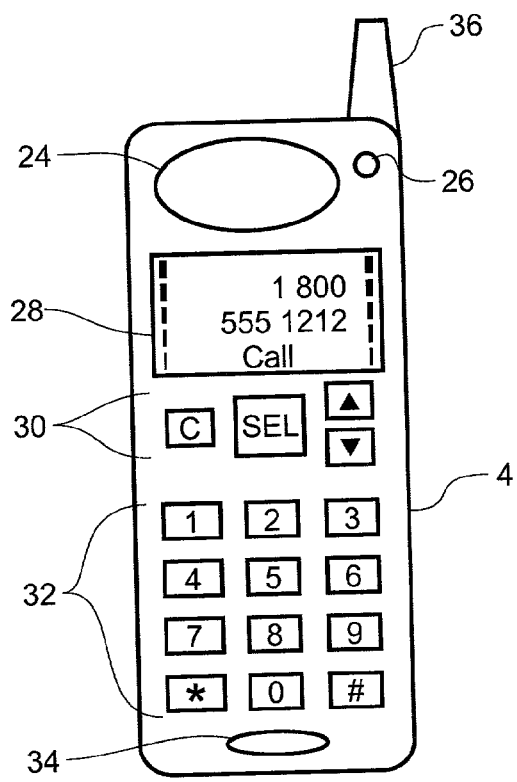
FIG. 3 is a drawing of the user interface of a prior art wireless telephone.
Figure 4:
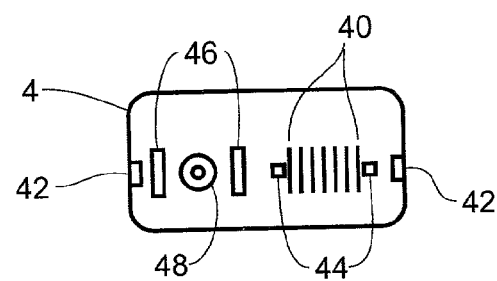
FIG. 4 is a drawing of the electrical interface of a prior art wireless telephone.

The present invention can accommodate any number of different types of wireless telephones through advantageous use of the interface adapter. By way of example and reference, and not for illustration of any limitations, FIG. 3 and FIG. 4 illustrate an exemplar prior art wireless telephone suitable for interface to the present invention docking station. Most wireless telephones 4 share common characteristics, and the present invention takes advantage of this fact. In FIG. 3, which is a view of the user interface of a wireless telephone 4, there is an earphone speaker 24, a display 28, a group of function keys 30, a conventional telephone keypad 32, a microphone 34, a power switch 26, and an antenna 36. Such wireless telephones typically employ a menu selection interface of various wireless telephone functions. FIG. 4 illustrates the mechanical and electrical interface of a typical wireless telephone 4. Wireless telephone manufacturers and suppliers do provide adjunct products designed to operate in conjunction with their wireless telephones. For example, headset/microphones are offered. So too are hands-free systems for use in motor vehicles, battery charging cradles, and interfaces for modems and other data ports. Such items are well understood by those of ordinary skill in the art. To meet the interface requirements of such adjunct devices, most prior art wireless telephone include an electrical interface, accessible from the exterior of the telephone, which presents the transmit and receive audio signals as well as a data interface and a power supply connection. FIG. 4 illustrates such an interface. A typical wireless telephone 4 interface includes a coaxial power supply connector 48, typically used with a wall-jack transformer. But, there is also available separate power supply terminals 46 that allow simple interface to cradle-type battery chargers and other mountable interfaces. The typical wireless telephone 4 also includes a bus-type connector 40 that has a plurality of electrical conductors and may include transmit and receive audio signals, transmit and receive data signals, system ground, and system power supply signals. The interface protocol and specifications for such an interface can be obtained from the wireless telephone manufacturer either freely or through a licensing arrangement, or can be reverse engineered if necessary. Of course, different wireless telephones employ different physical interfaces, which may be of the form of a straight bus connector, for example.

FIG. 4 also illustrates part of the mechanical interface of a wireless telephone 4. These may include notches, recesses or pins 42 used to align the wireless telephone, and may include other alignment notches, recesses or pins 44 used to particularly align the electrical connector 42. In addition, the physical size, shape, and dimensions of the wireless telephone are used in designing a cradle, on which it will rest or be inserted into.

Figure 5:
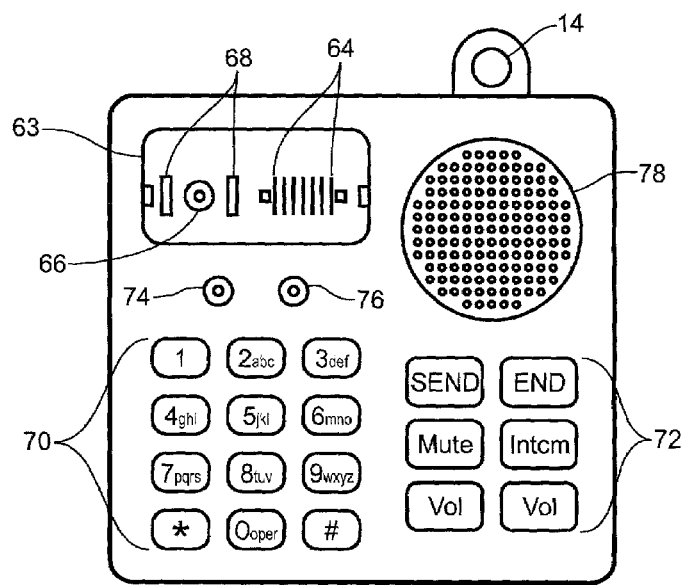
FIG. 5 is a top view of the base unit in an illustrative embodiment of the present invention.
Figure 6:
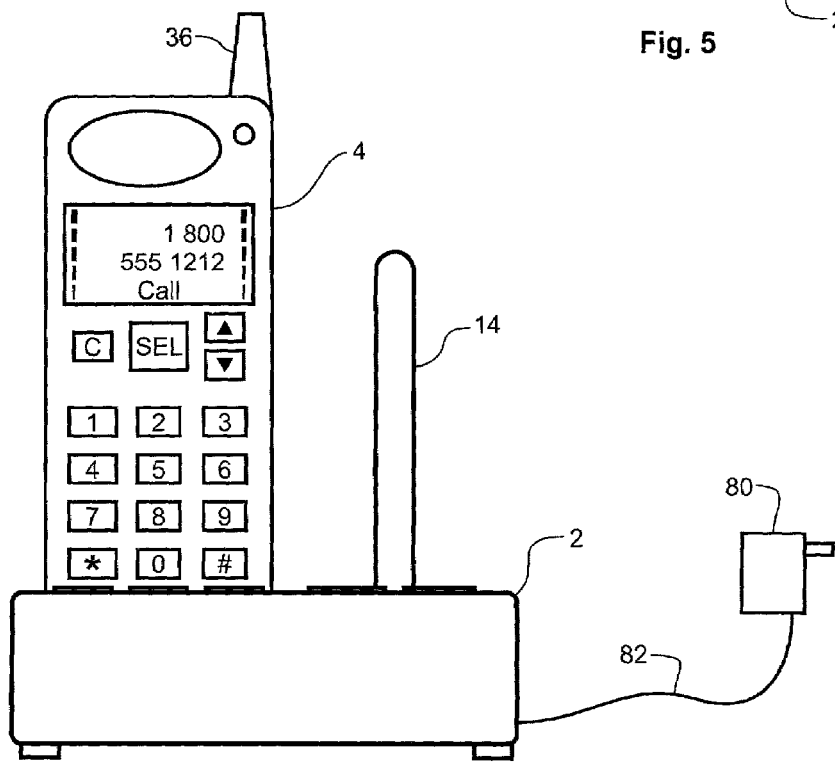
FIG. 6 is a front view of the base unit, with a wireless telephone docked therein, in an illustrative embodiment of the present invention.

Reference is directed to FIG. 5 and FIG. 6, which illustrate a wireless telephone docking station 2 in an illustrative embodiment of the present invention. FIG. 5 particularly illustrates the user interface and wireless telephone cradle 63. FIG. 6 illustrates a front elevation of the docking station 2 with a wireless telephone 4 engaged with the cradle 63. The docking station 2 of the illustrative embodiment is molded from plastic and houses the various circuitry defined later with respect to the functional block diagram. The antenna 14 extends about the housing. In the illustrative embodiment a user interface is provided for user control of the docking station 2. The user interface includes a conventional telephone keypad 70 that can be used to control the wireless telephone and to emulate the cordless telephone terminal unit that is embodied within the housing. In operation, the telephone keypad 70 can used to dial a called party telephone number for outgoing calls from the wireless telephone 4. The keypad 70 can also be used to define and access cordless telephone terminal units in the multiple handset cordless telephone system. The docking station 2 user interface further includes a loudspeaker 78 and a microphone 74 that are used in the speakerphone function provided therein. And indicator lamp 76 is also provided to indicate operational status of the unit, including speakerphone active, wireless call in progress and other status indications. The lamp 76 may alternatively be an alphanumeric or other display, as preferred. Several function keys 72 are also provided to control of speaker volume, muting, intercom function among the plural cordless system terminal units and for initiation and termination of telephone and intercom calls.

The wireless telephone cradle 63 is formed in the housing of physical dimensions suitable for engaging the base of the wireless telephone 4. There are plural mechanical and electrical interface items disposed in the cradle 63 that correspond to the interface of the particular wireless telephone the docking station 2 is designed to accommodate. In particular, a coaxial power supply connector 66, or separate power supply terminals 68. The functional interface is implemented with an audio and data bus connector 64 that complies with the signaling present in the particular wireless telephone.

Another added measure a convenience is obtained by providing a power supply adapter 80, which is coupled to the docking station 2 via power cord 82. The power supply adapter 80 provides operating power to the docking station 2 during normal operation. It also provides a source of current for recharging the rechargeable batteries in the wireless telephone 4. Without the use of the present invention, the user of a wireless telephone would require another means of recharging the batteries in the wireless phone. Since a user of the present invention will place the wireless telephone 4 in the cradle of the docking station 2 during extended periods when the wireless telephone 4 is used with the present invention, the ability to charge the batteries of the wireless telephone 4 with the present invention advantageously eliminates the need for an alternative charging apparatus.

Figure 7:
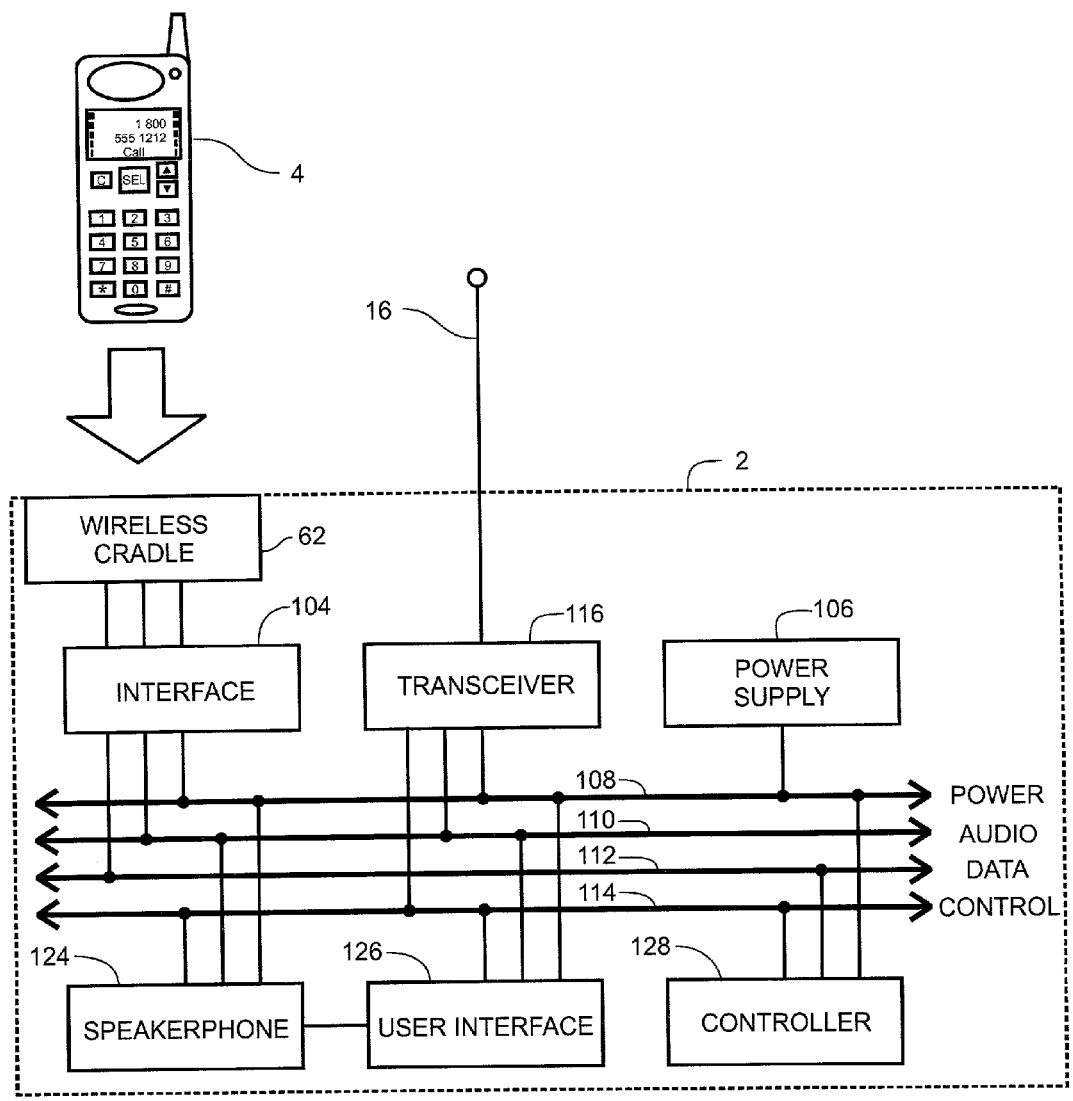
FIG. 7 is a functional block diagram of an illustrative embodiment of the present invention.

Reference is directed to FIG. 7, which is a functional block diagram of an illustrative embodiment according to the present invention. The wireless telephone 4 rest in and connects to the wireless telephone cradle 62 in the docking station 2. The functional structure of the docking station 2 can readily be modeled as bus architecture, having four basic bus paths. These include a power bus 108, audio signal bus 110, data signal bus 112, and internal control bus 114. The function of the power bus 108 is to receive electric power from the power supply 106 and distribute it within the docking station and to the wireless telephone 4 for power supply and battery charging. The audio bus 110 carries transmit and receive audio signals between the wireless telephone 4, the speakerphone 124, and the transceiver 116. The data bus 112 carries wireless telephone 4 data signals between the wireless telephone and the controller 128 in the docking station. The control bus 128 carries control information from controller 128 to the wireless telephone 4, the speakerphone 124, the user interface 126, and the transceiver 116. It is to be understood that the bus structure is meant as a model of the architecture and that formally laid out bus structures on a printed circuit board are not required. Rather, this is an exemplary embodiment, and those of ordinary skill in the art will appreciate that other circuit topologies can be employed to achieve the same or similar results.

More specifically, respecting FIG. 7, the wireless telephone 4 coupled to the wireless cradle 62, both mechanically and electrically. An interface 104 interconnects and adapts the signal levels between the wireless telephone 4 and the various internal circuitry of the docking station 2. The data signals from the wireless telephone 4 are thus coupled to the internal data bus 112. So too are transmit and receive audio signals from the wireless telephone 4 coupled to the audio bus 110. Power is delivered from the power bus 108 to the wireless telephone 4 though interface 104, with power level conversion if needed, via wireless cradle 102. The source of external power is an AC/DC cord-mounted power converter 82 (not shown in FIG. 7) in the illustrative embodiment. A transceiver 116 is also coupled to the audio bus 110. Thus, the audio signals from the wireless telephone 4 can be selectively coupled to the transceiver from broadcast and reception to and from the multiple handset cordless telephone system. The general operation of the transceiver, however, is controlled by controller 128 by communications thought the control bus 114. Therefore, the wireless telephone 4 does not generally control the docking station, rather controller 128 controls the docking station functions though execution of software programs.

The controller 128 may be any of the large variety of microprocessor, microcontrollers, or even digital signal processors currently available, or which may later become available. Such a controller will typically include memory for storage of source code software, RAM, and other memory as needed to implement features and functions of the device. Those of ordinary skill in the art will appreciate the proper selection and implementation of a suitable controller device.

Again referring to FIG. 7, the controller 128 executes software to control transceiver 116 in its operation as a terminal unit compliant with the multiple handset cordless telephone system protocol. The air protocol between the transceiver 116 and the multiple handset cordless telephone system is defined by the protocol employed by that host system. Such protocols are known and understood by those of ordinary skill in the art. A user interface 126, which includes the standard telephone keypad and the function keys described herein before, is coupled to the control bus 114 so that key actuations are sensed by controller 128. The speakerphone 124 is a part of the user interface, and the audio signals are derived from the audio bus 110. When the speakerphone key is actuated, this actuation is sensed by the controller 128 which controls switches to couple the wireless telephone audio signals, or the transceiver 116 audio signals to the loudspeaker and microphone circuits in the speakerphone.

Figure 8:
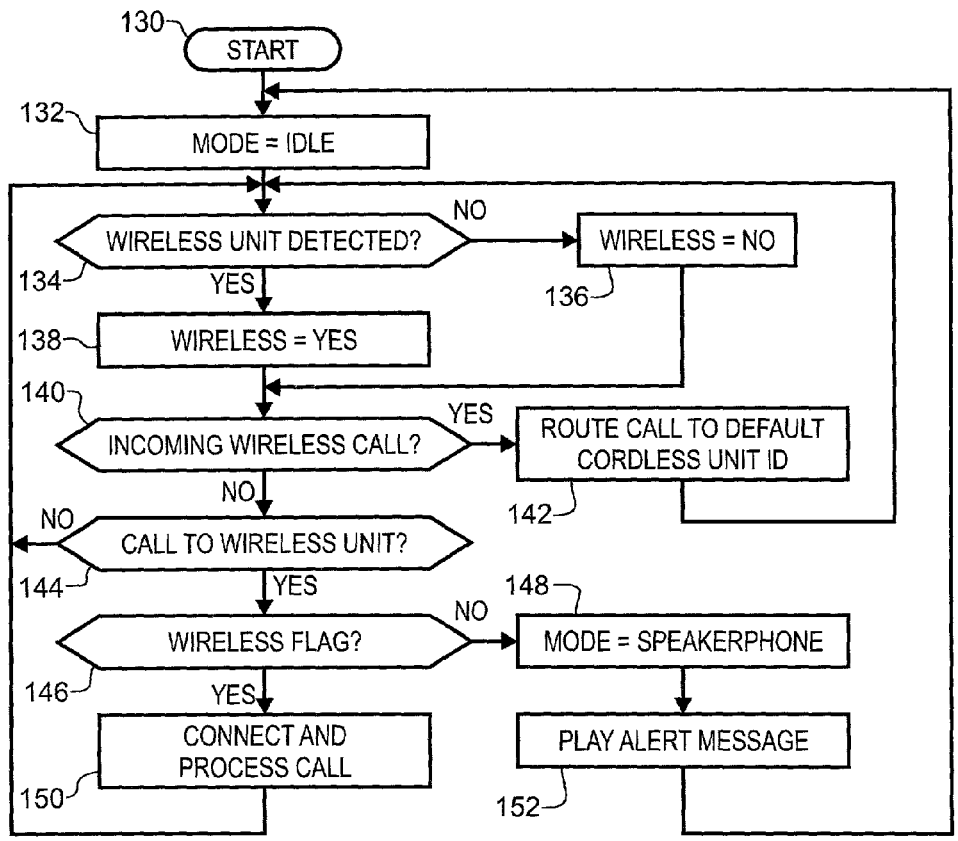
FIG. 8 is a flow diagram in an illustrative embodiment of the present invention.

Reference is directed to FIG. 8, which is a flow diagram of the docking station operation in an illustrative embodiment of the present invention. The process begins at step 130 when the docking station is energized. The mode of operation is set to IDLE at step 132, awaiting the initiation of some communications. At step 134, the unit checks to determine if the wireless telephone is present in the cradle. This test repeats regularly to determine if and when the user inserts or removes the wireless telephone from the docking station. If the wireless telephone is not detected at step 134, then a flag is set to NO at step 136, indicating that no wireless phone is available for communications. Alternative, at step 134, if the wireless telephone is detected, then flow proceeds to step 138 where the flag is set to YES. In either case, flow proceeds to step 140 after the wireless telephone detection routine. At step 140, the process checks for an incoming wireless telephone call. If a call is detected, then the call is processed at step 142 where it is routed to the default cordless telephone unit ID. The unit ID is a programming choice made by the user. This choice directs incoming wireless calls to one particular of the plural multiple handsets in the cordless system. After the call is processed and routed at step 142 flow returns to step 134 to repeat.

On the other hand, at step 140, if an incoming wireless call has not been received, then flow continues to step 144 where the process tests to determine is a call is being placed from the cordless system to the wireless telephone. If no such call is occurring, then flow recirculates to step 134. On the other hand, at step 144, if call to the wireless unit has been requested, then flow proceeds to step 146 where the process tests for the state of the wireless flag set at steps 134, 136, and 138. If the wireless flag is set to YES, then call is connected at step 150. Also, the call is processed, and then flows returns to step 134. On the other hand, at step 146, if the wireless flag is set to NO, indicating that the wireless telephone is not available for communications, then flow proceeds to step 148 where the mode is set from IDLE to SPEAKERPHONE. This mode switch connects the audio signals from the transceiver to the speakerphone in lieu of the wireless telephone. A digitally produced alert message is produced by the controller to the transceiver so that the requesting cordless telephone user can be made aware of the unavailability of the wireless telephone. Then, the speakerphone is coupled to the transceiver so that any user in the vicinity of the docking station can communicate with the cordless user making the call request. This is useful, for example, for the requesting user to ask that the wireless telephone be inserted into the cradle. After completion of the communication, flow returns to step 132 where the mode is reset to IDLE.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A docking station for interconnecting telephone calls between a wireless telephone and a multiple handset cordless telephone system having a cordless base unit, and that operates in accordance with a radio air protocol, which defines individual handset addresses for multiple cordless terminal units, comprising:

an electrical interface having an audio signal coupling and a data signal coupling for engaging the wireless telephone;

a transceiver operable to communicate in accordance with the radio air protocol with the multiple handset cordless telephone system as a terminal unit and in accordance with a handset protocol portion the radio air protocol, which is assigned one of the individual handset addresses, thereby enabling communications with the multiple cordless handsets only through the cordless base unit, said transceiver selectively coupled to said audio signal coupling, and a controller coupled to control said transceiver and coupled to said data signal coupling, said controller operable to communicate data signals with the wireless telephone when coupled to said electrical interface, and operable to process telephone calls between the wireless telephone and the multiple handset cordless telephone system through control of said transceiver in accordance with the multiple handset radio cordless telephone system radio air protocol and said one of the individual handset addresses, thereby enabling audio communications by selectively coupling said audio signal coupling and said transceiver.

2. The apparatus of claim 1 further comprising a power supply coupled to said electrical interface for providing electrical power to the wireless telephone when engaged therewith.

3. The apparatus of claim 1 wherein said controller selectively couples said audio signal coupling to said transceiver upon receipt of data indicative of an incoming telephone call from the wireless telephone.

4. The apparatus of claim 1 wherein said controller selectively couples said audio signal coupling to said transceiver upon receipt of data indicative of a call request from the multiple handset cordless telephone system.

5. The apparatus of claim 4 wherein said call request data includes a called party telephone number, and said controller couples said telephone number to said data signal coupling.

6. The apparatus of claim 1 further comprising:

a telephone keypad coupled to said controller, and wherein said controller is operable to receive telephone number digits from said keypad and couple said telephone number digits to said data signal coupling.

7. The apparatus of claim 1 further comprising:

a speakerphone selectively coupled to said audio signal coupling and said transceiver.

8. The apparatus of claim 7 wherein said controller is operative to selective couple said speakerphone to said transceiver when the wireless telephone is disengaged from said electrical interface.

9. The apparatus of claim 7 further comprising:

an actuator coupled to said controller, and wherein actuation of said actuator causes said controller to selectively couple said speakerphone to said transceiver, thereby enabling speakerphone functionality for the multiple handset wireless telephone systems.

10. The apparatus of claim 1 wherein said controller controls said transceiver to communicate in accordance with the Bluetooth protocol specification.

11. A method of interconnecting telephone calls between a wireless telephone and a multiple handset cordless telephone system having a cordless base unit, which operates in accordance with a radio air protocol that defines individual handset addresses for multiple cordless terminal units, using a docking station implemented as a terminal unit, which is assigned one of the individual handset addresses in the multiple handset cordless telephone system, and having an audio and data interface for engaging the wireless telephone and a transceiver operable to communicate audio and data via radio signals with the multiple handset cordless telephone system as a terminal unit and in accordance with a handset protocol portion of the radio air protocol, the method comprising the steps of:

processing data signals between the transceiver and the interface;

controlling the transceiver to operate in accordance with the multiple handset radio cordless telephone system radio air protocol by utilizing one of the individual handset addresses, thereby enabling communications with the multiple cordless handsets only through the cordless base unit, and selectively coupling the audio interface with the transceiver in accordance with said data signals, thereby processing a telephone call between the wireless telephone and the multiple handset cordless telephone system.

12. The method of claim 11 further comprising the step of engaging the wireless telephone with the electrical interface.

13. The method of claim 11 further comprising the step of delivering electrical power from the docking station to the wireless telephone through the interface.

14. The method of claim 11 wherein said selectively coupling step occurs upon receipt of data indicative of an incoming telephone call from the wireless telephone.

15. The method of claim 11 wherein said selectively coupling step occurs upon receipt of data indicative of a call request from the multiple handset cordless telephone system.

16. The method of claim 15 wherein said call request includes a called party telephone number, further comprising the step of coupling said telephone number to said interface.

17. The method of claim 11 wherein the docking station includes a telephone keypad, further comprising the steps of:

receiving telephone number digits from the keypad, and coupling said telephone number digits to the wireless telephone through said interface.

18. The method of claim 11 wherein the docking station includes a speakerphone, further comprising the step of:
   selectively coupling the speakerphone to the transceiver, thereby providing speakerphone functionality to the multiple handset cordless telephone system.

19. The method of claim 11 wherein the transceiver is controlled to communicate in accordance with the Bluetooth protocol specification.

* * * * *